United States Patent
Bedi et al.

(10) Patent No.: US 12,244,737 B2
(45) Date of Patent: *Mar. 4, 2025

(54) SYSTEMS AND METHODS FOR DISTRIBUTED, STATELESS, AND DYNAMIC BROWSER CHALLENGE GENERATION AND VERIFICATION

(71) Applicant: DRNC HOLDINGS, INC., Wilmington, DE (US)

(72) Inventors: Harkeerat Singh Bedi, Los Angeles, CA (US); Revathi Sabanayagam, Torrance, CA (US); Devender Singh, Westminster, CA (US); Reed Morrison, Torrance, CA (US)

(73) Assignee: DRNC HOLDINGS, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/944,739

(22) Filed: Sep. 14, 2022

(65) Prior Publication Data

US 2023/0179433 A1    Jun. 8, 2023

Related U.S. Application Data

(63) Continuation of application No. 17/152,496, filed on Jan. 19, 2021, now Pat. No. 11,558,206.

(51) Int. Cl.
*H04L 9/32* (2006.01)
*H04L 9/08* (2006.01)

(52) U.S. Cl.
CPC .......... *H04L 9/3271* (2013.01); *H04L 9/0825* (2013.01); *H04L 9/0869* (2013.01); *H04L 9/3213* (2013.01)

(58) Field of Classification Search
None
See application file for complete search history.

(56) References Cited

U.S. PATENT DOCUMENTS 7,536,722 B1 * 5/2009 Saltz ................. G06F 21/33
726/20
11,558,206 B2   1/2023 Bedi et al.
(Continued)

FOREIGN PATENT DOCUMENTS

CN        109218251 A       1/2019
WO   WO-2015032281 A1 *   3/2015   ......... G06F 21/31

*Primary Examiner* — Bassam A Noaman
(74) *Attorney, Agent, or Firm* — Richard LaPeruta

(57) ABSTRACT

Provided is an unobtrusive client verification system with one verification devices having processors that are configured to receive a first request from an unverified client device, generate a random number in response to receiving the first request from the unverified client device, define a set of expressions as a browser challenge problem that evaluates to an answer specified by the random number, encrypt the answer within an answer token, provide the browser challenge problem with the answer token to the unverified client device, receive a second request with a solution to the browser challenge problem and the answer token from the unverified client device, and verify the unverified client device in response to the solution matching the answer that is decrypted from the answer token provided with the second request.

19 Claims, 7 Drawing Sheets

(56) References Cited

U.S. PATENT DOCUMENTS

| | | | |
|---|---|---|---|
| 2004/0139152 A1* | 7/2004 | Kaler | H04L 63/1458 |
| | | | 709/203 |
| 2005/0235150 A1 | 10/2005 | Kaler et al. | |
| 2007/0179905 A1* | 8/2007 | Buch | H04L 51/212 |
| | | | 705/75 |
| 2013/0080242 A1* | 3/2013 | Alhadeff | G06F 16/957 |
| | | | 705/14.39 |
| 2015/0195289 A1 | 7/2015 | Kalgi et al. | |
| 2017/0180373 A1* | 6/2017 | Shao | H04L 63/0876 |
| 2018/0097787 A1 | 4/2018 | Murthy et al. | |
| 2018/0367526 A1* | 12/2018 | Huang | G06F 21/31 |
| 2019/0332747 A1 | 10/2019 | Raman et al. | |
| 2020/0117776 A1* | 4/2020 | de Souza | H04L 9/3271 |
| 2020/0314190 A1 | 10/2020 | Phillips | |
| 2021/0044976 A1* | 2/2021 | Avetisov | H04L 9/321 |
| 2022/0247579 A1* | 8/2022 | Bester | H04W 12/06 |

* cited by examiner

SYSTEMS AND METHODS FOR DISTRIBUTED, STATELESS, AND DYNAMIC BROWSER CHALLENGE GENERATION AND VERIFICATION

CROSS-REFERENCE TO RELATED APPLICATIONS

This application claims the benefit under 35 U.S.C. § 120 as a continuation of U.S. patent application Ser. No. 17/152,496, filed Jan. 19, 2021, now U.S. Pat. No. 11,558,206, the entire contents of which are incorporated herein by reference.

BACKGROUND

CAPTCHA is a form of obtrusive client verification that requires human interaction. CAPTCHA and/or other obtrusive client verifications may be used to verify that network requests and/or data originate from a valid user as opposed to a bot.

Browser challenges are a form of unobtrusive client verification that do not require human interaction. To perform a browser challenge, a server may send a problem in response to a request or data from a client. The server may verify that the client is running a valid browser instance, and is therefore a valid user and not a bot, that simply generates traffic, upon receiving a correct answer to the problem from the client.

Browser challenges may be subject to replay attacks. Specifically, a server or platform may have a finite set of problems that are issued as the browser challenges. A replay attack may involve using one or more client devices to gradually obtain each of the problems, and to generate the correct answers for the finite set of problems issued by the server or platform. The answers may then be distributed across a botnet. The botnet may be configured with simple logic that maps each answer to a corresponding problem. The botnet may then able to thwart the protections afforded by the browser challenges by simply replaying the answers to the problems issued by the server or platform rather than solving the problems.

DETAILED DESCRIPTION OF PREFERRED EMBODIMENTS

Figure 1:
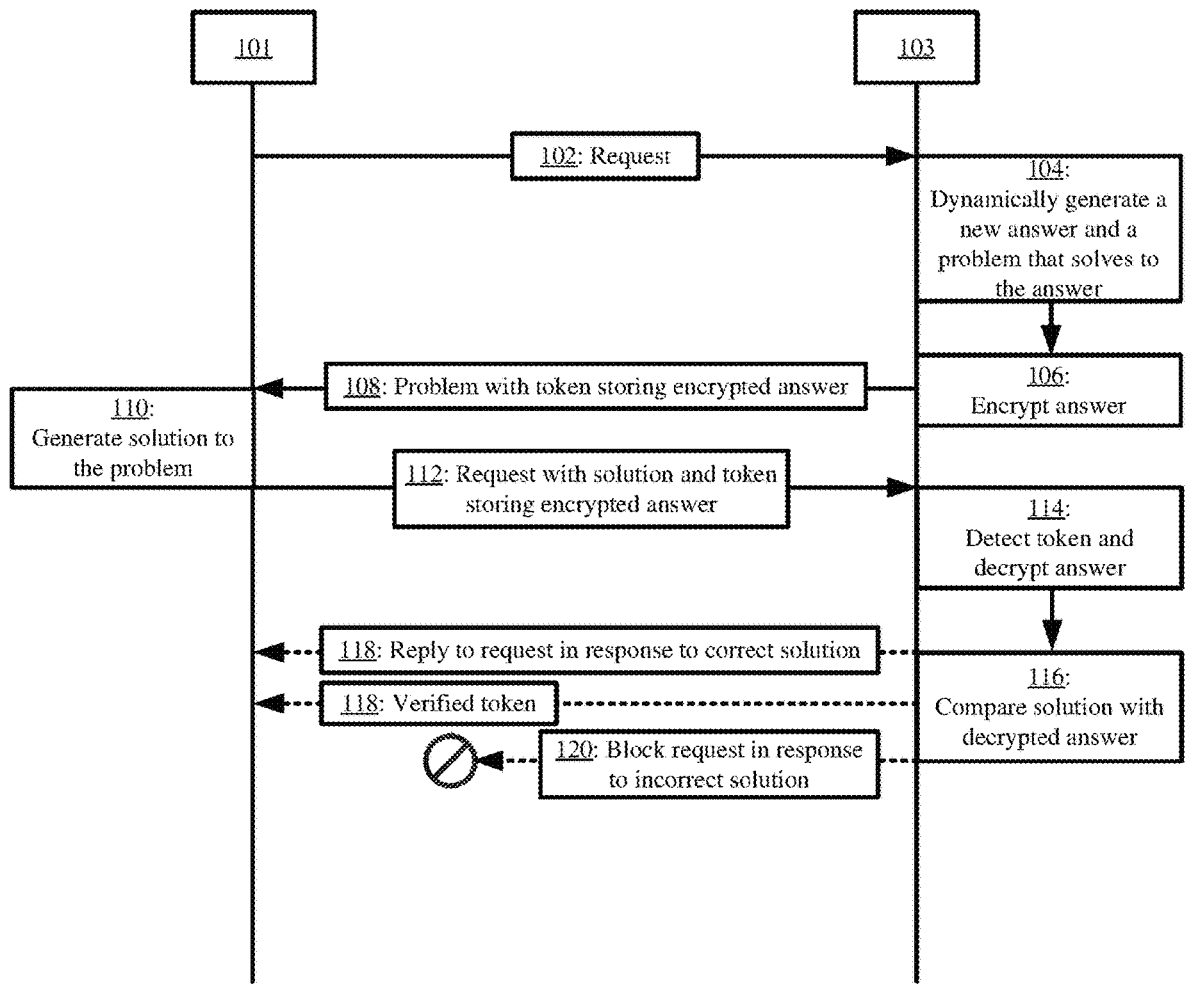
FIG. 1 illustrates an example of distributed, stateless, and dynamic browser challenge generation and verification in accordance with some embodiments presented herein.

The following detailed description refers to the accompanying drawings. The same reference numbers in different drawings may identify the same or similar elements.

Systems and methods, as described herein, provide distributed, stateless, and dynamic browser challenge generation and verification. In particular, the systems and methods may generate a new and different browser challenge or problem for each request or client from any device, server, or node of a distributed platforms. The systems and methods may perform a stateless and distributed verification of a particular client by determining whether the solution to a browser challenge or problem provided by the particular client is the correct answer at any device, server, or node that may be the same or differ from the device, server, or node that generated and provided the browser challenge or problem to the particular client.

The distributed, stateless, and dynamic browser challenge generation may prevent reuse of answers to previously solved problems as there is no longer a finite set of problems and solutions from which to implement such an attack. Moreover, the distributed, stateless, and dynamic browser challenge generation may prevent one bot or client from becoming successfully verified, and sharing its verification state with other bots or clients.

In some embodiments, devices, servers, or nodes of a distributed platform may be used as verification devices of a verification system that perform the distributed, stateless, and dynamic browser challenge generation and verification. In some such embodiments, the dynamic browser challenge generation performed by the verification devices may include randomly generating an answer, generating a problem (e.g., a set of expressions, mathematical computations, or browser operations) that evaluates to the randomly generated answer, encrypting the answer, and providing the encrypted answer with the problem to a client. The distributed and stateless verification of the dynamically generated browser challenge or problem may include receiving a solution to the problem and the encrypted answer from the client at any verification device, decrypting the answer at the receiving verification device, comparing the client provided solution to the decrypted answer, and verifying the client in response to the client provided solution matching the decrypted answer. Once verified, the client may access content, services, and/or data from the verification device and/or other servers or nodes of the distributed platform.

Accordingly, the verification system is dynamic because a new and different problem and answer are generated for each client or client request such that verification requires the unique answer to the generated problem with little or no possibility of the problem and answer matching a problem and answer that was previously issued. The verification system is distributed because a first verification device may generate and provide the client with a unique problem and the encrypted answer, and a different second verification device may verify the client based on the solution provided by the client and the client returning the encrypted answer to the second verification device. The verification system is stateless because the answer is not stored by any verification device. Instead, the answer is encrypted and passed along with the problem to a client, and the client returns the encrypted answer along with its solution to the problem to any verification device (e.g., device, server, or node of the distributed platform) that may then verify the client based on the provided solution and the encrypted answer accompanying the provided solution.

FIG. 1 illustrates an example of the distributed, stateless, and dynamic browser challenge generation and verification in accordance with some embodiments presented herein. FIG. 1 presents a message exchange between client 101 and verification device 103.

Client 101 may include a network-enabled device that requests content, services, and/or data from verification device 103 via a data network (e.g., the Internet). Client 101 may correspond to a computer, tablet, smartphone, set-top appliance, Internet-of-Things ("IoT") device, and/or other device that accesses content, services, and/or data over a data network. Client 101 may access the content, services, and/or data using Internet Protocol ("IP"), Transmission Control Protocol ("TCP"), HyperText Transfer Protocol ("HTTP"), and/or other network protocol messaging and/or data packets.

Verification device 103 may include an element within the verification system for receiving and responding to client requests, and/or a device, machine, server, or node of a distributed platform that hosts and distributes different content, services, and/or data. In some embodiments, verification device 103 may verify clients (e.g., client 101) before providing those clients access to any requested content, services, and/or data. In some such embodiments, verification device 103 may retrieve, store, and/or serve the requested content, services, and/or data. Alternatively, verification device 103 may forward requests from verified clients to other nodes of the distributed platform that then distribute the requested content, services, and/or data to the verified clients.

As shown in FIG. 1, client 101 may issue (at 102) a request. The request may include a Uniform Resource Locator ("URL") or other identifier for accessing specific content, services, and/or data from verification device 103 or the distributed platform that is accessed through verification device 103. The request may be provided as a HTTP message, or as a message or data packet of another network protocol.

Verification device 103 may receive (at 102) the request from client 101. Verification device 103 may determine that client 101 has not been verified as a valid user. The determination that client 101 has not been verified as a valid user may be based on the request being issued (at 102) without a verified token that indicates successful prior verification of client 101 or an answer token that indicates that client 101 is responding to a previously generated browser challenge problem. Alternatively, verification device 103 may store unique identifiers for verified clients, and may determine that the unique identifier of client 101 is not within the stored list of unique identifiers for verified clients.

In response to determining that client 101 has not been verified, verification device 103 may dynamically generate (at 104) a new answer and a problem that solves to the answer. In some embodiments, the answer may include a randomly generated numerical value. In some such embodiments, the problem may include a set of two or more expressions, mathematical operations, browser operations, and/or scripting code that produce the answer.

Verification device 103 may encrypt (at 106) the answer. Encrypting (at 106) the answer may include obfuscating the answer from a first representation or first encoding to a different second representation or second encoding. For instance, the answer may have an unencrypted value of "129", and an encrypted value of "AS14V". Verification device 103 may use a private encryption key, that is known only to verification device 103 and other verification devices in the same verification system, to encrypt the answer.

Verification device 103 may provide (at 108) a response to client 101. The response may include the dynamically generated problem and an answer token with the encrypted answer. The problem may be embodied in the response as HyperText Markup Language ("HTML"), JavaScript, Python, and/or other browser-executable code, scripts, or operations. The answer token may be provided within the header or body of the response, or may be provided as a separate data packet or file that accompanies the response. In some embodiments, the response may include a redirect packet that causes client 101 to reissue the original request with a solution to the problem and the answer token.

Client 101 may receive (at 108) the response from verification device 103. Client 101 may parse the HTML and/or other code from the response when running a valid browser application, and may generate (at 110) a solution to the problem by evaluating or solving the problem. If client 101 was a bot that simply generates and sends malicious traffic, the bot would be unable to parse the response, and/or generate (at 110) the solution to the problem. The response may cause client 101 to set a first cookie with the contents of the answer token (e.g., the encrypted answer), and/or to set a second cookie with the generated solution.

Upon processing the response, client 101 may provide (at 112) the generated (at 110) solution along with the answer token storing the encrypted answer back to verification device 103. In some embodiments, the response may contain a redirect link that causes client 101 to reissue (at 112) the original request (e.g., issue a request to the URL specified in the original request sent at 102) with the first cookie corresponding to the answer token and the second cookie containing the generated (at 110) solution. In some other embodiments, the solution may be inserted in the header or body of the reissued (at 112) request packet. In some other embodiments, the solution may be inserted in the answer token that is passed along with the reissued (at 112) request packet.

Verification device 103 may receive (at 112) the reissued request with the solution and the answer token storing the encrypted answer. Based on the contents of the reissued request (e.g., inclusion of the solution and/or the answer token), verification device 103 may perform a stateless verification of client 101. In particular, verification device 103 may detect (at 114) the answer token that was provided with the reissued request, and may decrypt the encrypted answer to the problem from the answer token. For instance, verification device 103 may use the same encryption key or a complimentary decryption key to revert the encrypted value "AS14V" to the correct answer "129" for the browser challenge and/or problem that was sent to client 101.

Verification device 103 may compare (at 116) the solution to the problem, that was generated by client 101 and that was included with the reissued request, to the answer that was decrypted from the answer token accompanying the reissued request. In response to determining that the solution matches the answer, verification device 103 may unobtrusively verify client 101 as a valid user (e.g., a client that runs a valid browser application and/or that issues legitimate user traffic), and may reply (at 118) to the reissued request by providing client 101 with the requested content, services, and/or data. In some embodiments, client 101 may submit subsequent and/or new requests with the same answer token, and verification device 103 may verify or determine that client 101 has been successfully verified based on the continued submission of the answer token. In some other embodiments, verification device 103 may provide (at 118) client 101 with a verified token that client 101 may submit with each subsequent request to avoid reverification when requesting or accessing different content, or when requesting or access content from different verification devices, servers, or nodes of the same distributed platform or system. In some embodiments, verification device 103 may obtain and directly distribute (at 118) the requested content, services, and/or data to client 101. In some other embodiments, verification device 103, upon successful verification of client 101, may forward the request to another server or node that then transmits the requested content, services, and/or data to client 101. In response to determining that the solution does not match the answer, verification device 103 may determine that client 101 is a bot, invalid user, and/or device that sends illegitimate traffic. Accordingly, verification device 103 may block (at 120) or otherwise restrict client 101 from accessing content, services, and/or data when the solution provided by client 101 does not match the correct answer for the unique problem that was generated and provided (at 108) to client 101.

Figure 2:
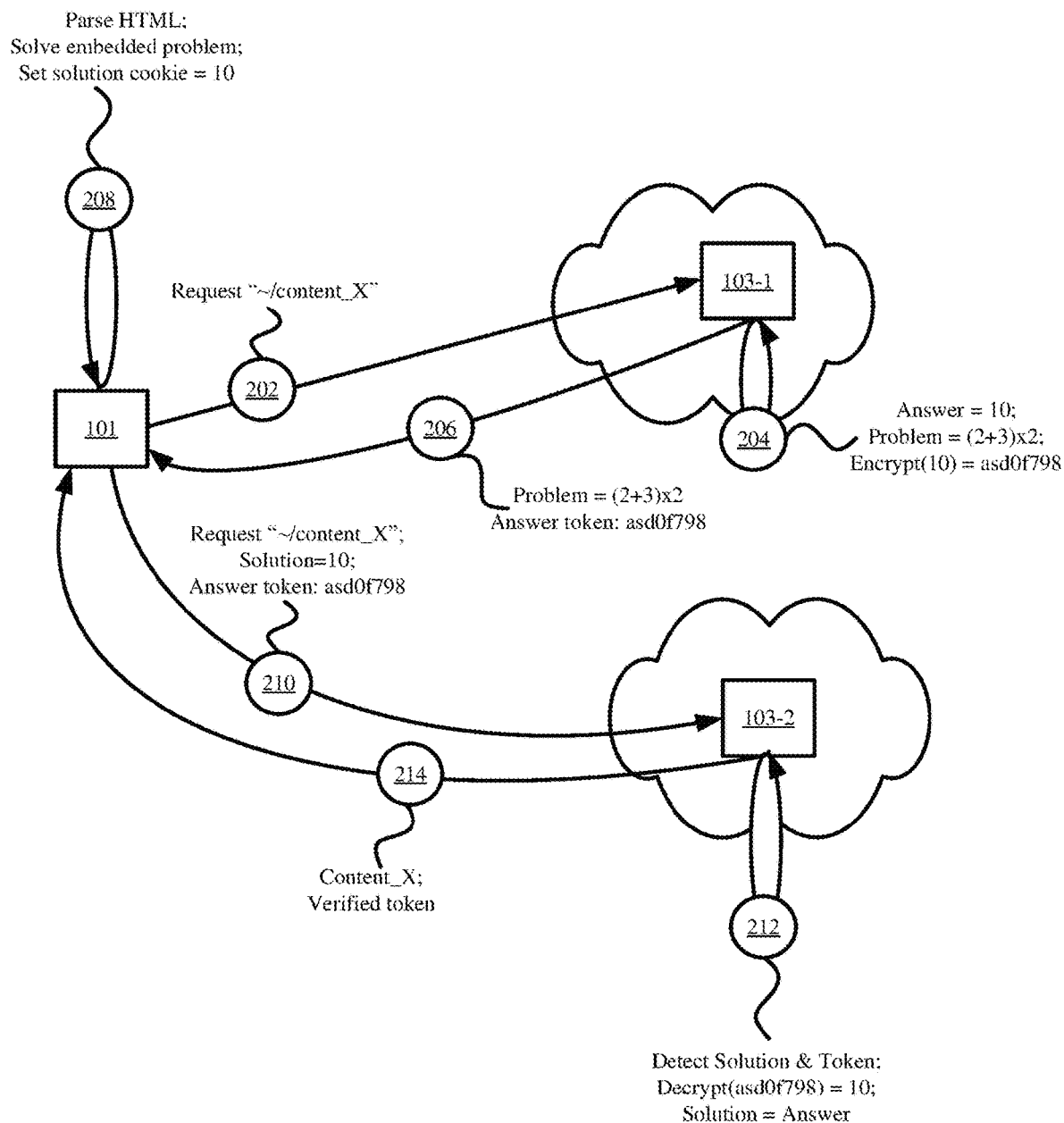
FIG. 2 illustrates an example of performing a distributed and stateless verification of a client based on a dynamically generated browser challenge in accordance with some embodiments presented herein.

FIG. 2 illustrates an example of performing a distributed and stateless verification of client 101 based on a dynamically generated browser challenge in accordance with some embodiments presented herein. As shown in FIG. 2, client 101 may issue (at 202) an initial request for particular content. The request may include a URL that identifies the particular content. The particular content may be accessed from different verification devices 103-1 and 103-2 at different points-of-presence ("PoPs"), sites, or locations of a distributed platform and/or verification system. The initial request may route to first verification device 103-1 at a first PoP, site, or location of the distributed platform. The initial request may route to first verification device 103-1 due to network congestion, proximity of client 101 to first verification device 103-1, and/or other routing criteria.

First verification device 103-1 may determine that client 101 has not been verified. The determine made by first verification device 103-1 may be based on the request from client 101 lacking a verified token, the request lacking a solution to a browser challenge problem, the request lacking an answer token, and/or the identifier of client 101 not being present within a list of identifiers for verified clients.

Accordingly, first verification device 103-1 may dynamically generate (at 204) a new problem with a set of expressions, mathematical computations, and/or browser operations that evaluate to a randomly generated answer. First verification device 103-1 may encrypt (at 204) the answer within an answer token, and may provide (at 206) client 101 with a message that includes the problem as HTML code, a script, or other instructions that are executed by a browser, and the answer token with the encrypted answer.

Client 101 may receive (at 206) the message, may parse contents of the message, and may solve (at 208) the problem as a result of parsing the contents of the message and/or executing the HTML code, scripts, or other instructions embedded therein. Solving (at 208) the problem may include executing the set of mathematical operations that define the problem, generating a solution after executing the set of mathematical operations, and creating a cookie that stores the solution.

Client 101 may reissue (at 210) the request for the particular content with the solution and the answer token. For instance, client 101 may reissue (at 210) the request to the same URL as the original issued (at 202) request, and may include the solution and/or the answer token in one or more cookies that accompany the request.

The reissued request may route to second verification device 103-2 at a different PoP, site, or location of the distributed platform than first verification device 103-1. The reissued request may route to a different destination than the original request issued (at 202) by client 101 due to changes in network congestion, changes in the physical location of client 101, changes in network routing policies, parameters of the reissued request, and/or other changes.

Second verification device 103-2 may receive (at 210) the reissued request from client 101. Second verification device 103-2 may determine that client 101 is subject to verification based on the request lacking a verified token, the request including a solution to a browser challenge problem (e.g., a first cookie with the solution), and/or the request including the answer token (e.g., a second cookie with the encrypted answer for the problem that was solved by client 101).

Second verification device 103-2 may verify (at 212) client 101 based solely on the data from the reissued (at 210) request. For instance, second verification device 103-2 may decrypt the answer from the answer token, compare the decrypted answer to the solution provided by client 101 in the reissued (at 210) request, and successfully verify client 101 in response to the decrypted answer matching the solution. Accordingly, second verification device 103-2 may verify (at 212) the solution to the problem that was generated by first verification device 103-1 in a distributed and stateless manner without any communication with first verification device 103-1 and/or without any prior mapping of the answer to the problem.

In response to successfully verifying client 101, second verification device 103-2 may transmit (at 214) the particular content that was requested by client 101 to client 101, may enable (at 214) access to the particular content at second verification device 103-2 or another node of the same distributed platform by client 101, and/or may provide (at 214) client 101 with a verified token. The verified token may include a secure value that notifies any verification device, server, and/or node of the verification system or distributed platform that client 101 has been verified. The verified token may also include an expiration time. The verified token may remain valid until the expiration time, and may permit client 101 to request and/or access data from any verification device, server, or node of the distributed platform without further verification and/or additional browser challenges until the expiration time is reached so long as the verified token is submitted with at least a first request for accessed data. Some embodiments exclude the verified token, and rely solely on the presence of a correct answer token to verify and/or reverify client 101 when requesting different content, services, and/or data from the same or different nodes during a browsing session. The same answer token may be used to verify or reverify client 101 so long as the answer token remains valid as determined from an expiration time included with the answer token.

Second verification device 103-2 may link the verified token to client 101 by including a unique identifier of client 101 in the verified token. The unique identifier may be derived from one or more of the IP address, Media Access Control ("MAC") address, user agent, supported versioning, and/or other header parameters in the data packets received from client 101. In some embodiments, second verification device 103-2 encrypt the unique identifier of client 101 prior to including the encrypted result in the verified token. The unique identifier prevents client 101 from sharing the verified token with other clients, and/or other clients from using the verified token that is generated for client 101 in order to gain unauthorized access to content, services, and/or data of the distributed platform. In some embodiments, each of the verification status, expiration time, and/or unique identifier may be encrypted or cryptographically secured to prevent tampering or unauthorized creation of the verified token.

Figure 3:
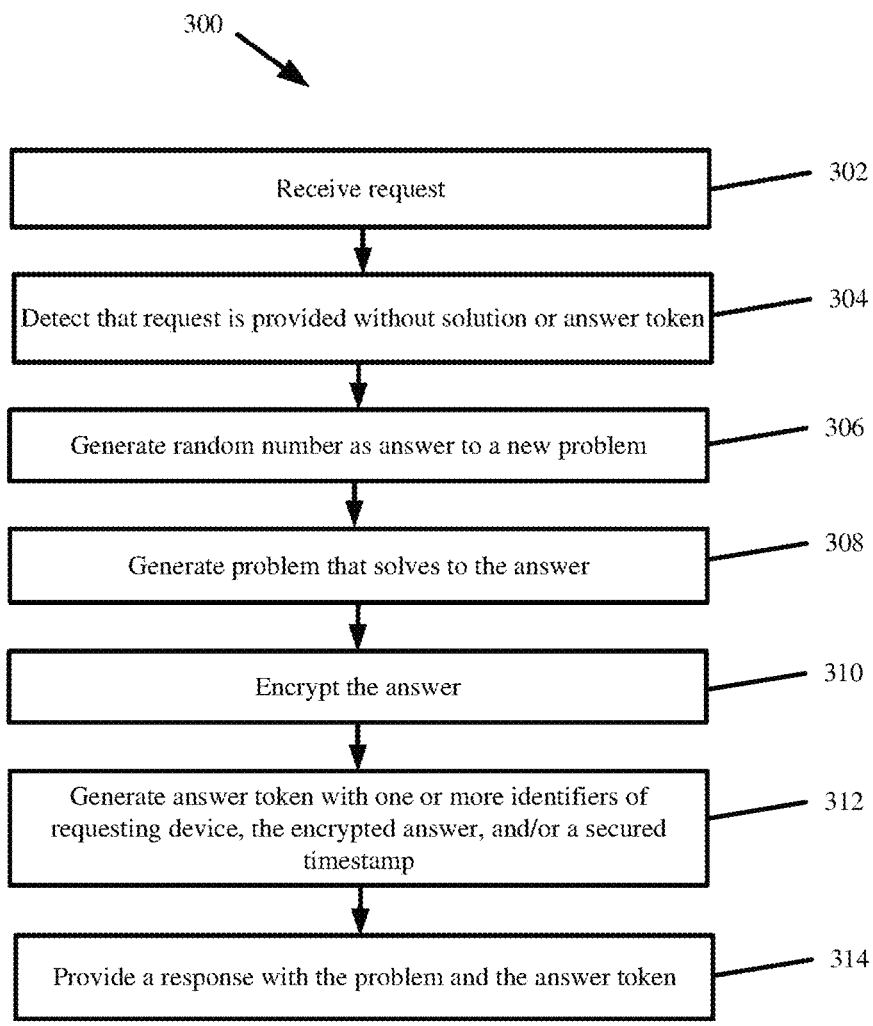
FIG. 3 presents a process for generating and distributing the dynamic browser challenge in accordance with some embodiments presented herein.

FIG. 3 presents a process 300 for generating and distributing the dynamic browser challenge in accordance with some embodiments presented herein. Process 300 may be implemented by any verification device or server of the verification system that receives a request, data, and/or packet from an unverified client.

Process 300 may include receiving (at 302) a request from an unverified client. The request may include any packet, message, and/or other data that is transmitted by the unverified client, and that is received by a verification device of the verification system. The request may include a URL that identifies specific content, service, and/or data to access from the destination identified by the URL, wherein the destination may correspond to the verification device or another device that is protected against attacks by the verification device. The request may also include a header with network addressing of the unverified client. For instance, the request header may include a source address field that specifies the IP of the unverified client. The header may include additional identifying information that may be used to construct a unique signature of the unverified client that is different from signatures of other clients or devices. For instance, the header may specify the user agent, device type, supported versioning, and/or other properties or parameters of the unverified client.

Process 300 may include detecting (at 304) that the request is provided without a solution to a problem, an answer token, and/or a verified token. The absence of the solution may be detected via an inspection of the request header, or may be detected by the absence of a cookie containing a solution value. In some embodiments, a custom header field may be used to store the solution to a dynamically generated browser challenge. In some other embodiments, the solution may be inserted within the answer token. Accordingly, a request that is not accompanied with an answer token may be indicative that no solution to a dynamically generated browser challenge was generated by the unverified client. In some embodiments, the answer token and/or the verified token may correspond to cookies, files, or data that may accompany the request, or that may be sent separately.

The verification device may classify the client that issued the request as an unverified client in response to detecting (at 304) that the request was issued without a solution to a problem, an answer token, and/or a verified token, and may initiate the unobtrusive distributed, stateless, and dynamic verification procedure of some embodiments. Accordingly, process 300 may include generating (at 306) a random number as a new answer for a yet-to-be generated problem. The verification device may seed a random number generator based on the current time and date to avoid replicating answers and/or problems.

Process 300 may include generating (at 308) a problem that evaluates to the answer. The verification device may generate (at 308) the problem as a long combination of different expressions that evaluate to the numerical value of the answer. The verification device may use uncommon expressions to obfuscate the problem. For instance, the JavaScript expression "((!![ ]]|!![ ])+!![ ]<<(true<<1))" may be included in the problem to produce a value of 8. Different such expressions may be added, multiplied, and/or otherwise combined to produce larger digits (e.g., the tens digit, the hundreds digit, etc.) of the answer, and the result of each expression may be added together to produce a value that is equal to the answer. In some embodiments, the problem is defined as HTML, JavaScript, Python, and/or other code or instructions that may be executed by any browser.

Process 300 may include encrypting (at 310) the answer. A reversible cryptographic hash or other encryption technique using a private key may be used to obfuscate the answer from a first value or first representation to a different second value or different second representation. In some embodiments, each verification device of the verification system or distributed platform may be configured with the same encryption key and/or decryption key to allow for the distributed and stateless verification.

Process 300 may include generating (at 312) an answer token with the encrypted answer, a unique signature of the unverified client, and/or timestamp. By including the unique signature of the unverified client, the verification device may unsure that the problem is not shared or answered by other clients or devices. For instance, if the answer token is returned by a device with a different address or signature than the requesting client, then the verification device and/or system may determine that the answer token was improperly shared between clients and/or devices, and may determine that the devices sharing the answer token are part of a botnet. In some embodiments, the verification device may also securely enter and/or encrypt a timestamp into the answer token to prevent a replay attack. For instance, a first client may solve the problem associated with the answer token, and may provide the answer token with the solution to other bots that spoof the signature of the first client. By including the timestamp within the answer token, a verification device may determine that an answer token being returned by a client is old, and therefore one that is being improperly replayed by the client.

Process 300 may include providing (at 314), in response to the received (at 302) request from the unverified client, a response with the problem and the answer token. In some embodiments, the response may be defined as a redirect message that causes the unverified client to reissue the request with the solution and the answer token. In some other embodiments, the response may be defined as an HTML page that contains the code for the problem, and additional code for the unverified client to return the solution to the problem, the answer token, and a new request (e.g., an HTTP GET message) to the original URL of the received (at 302) request.

When the executable code for the provided (at 314) problem runs in a browser on the client, the executable code may set two cookies on the client. The first cookie may correspond to the answer token and/or may contain the encrypted answer from the verification device. The second cookie may contain the solution that the client produces for the browser challenge or problem. The client may provide the first cookie and the second cookie along with a subsequent request (e.g., a reissued request) to one of the verification devices.

Figure 4:
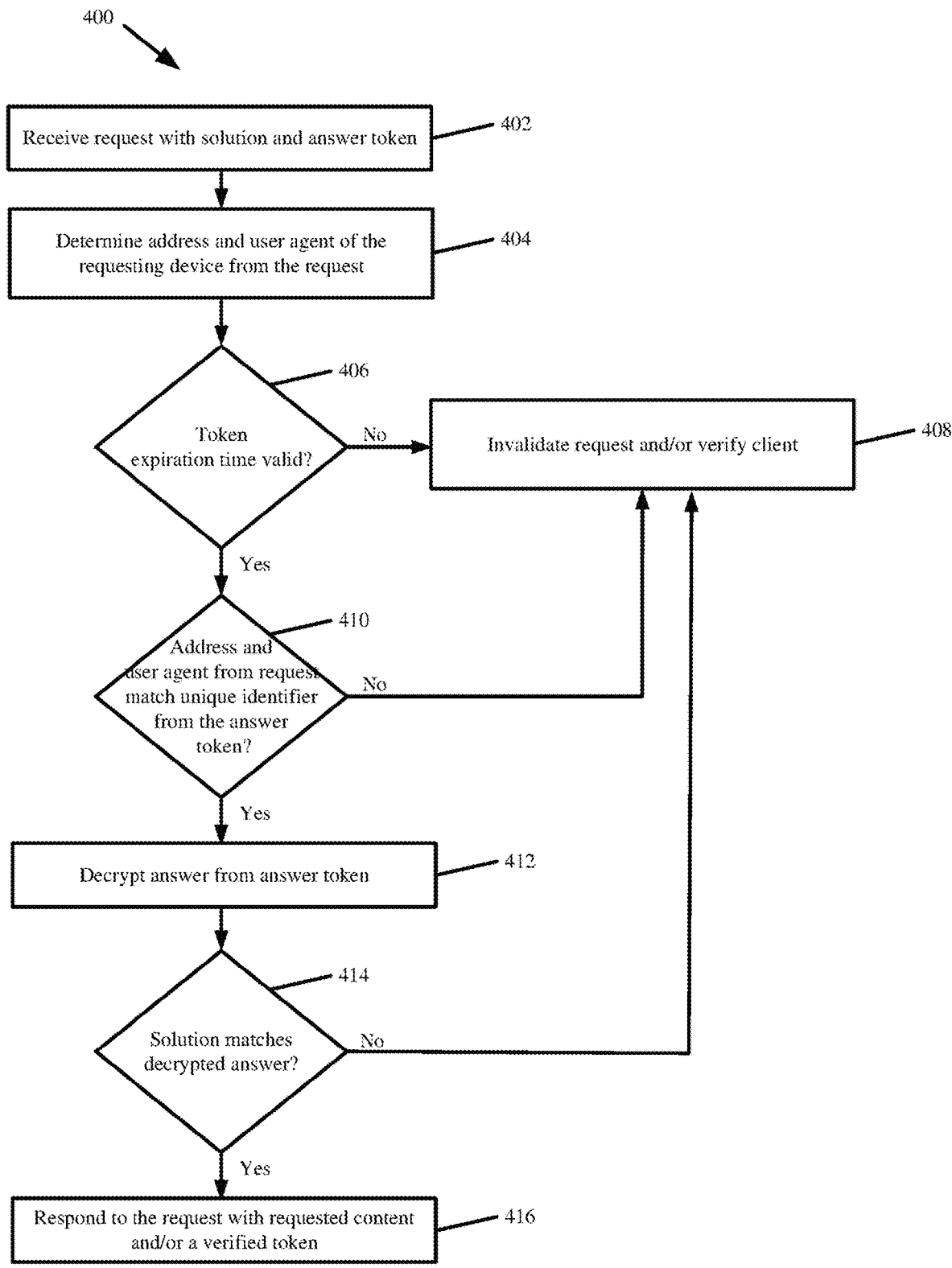
FIG. 4 presents a process for performing the distributed and stateless verification of a client based on a dynamically generated browser challenge in accordance with some embodiments presented herein.

FIG. 4 presents a process 400 for performing the distributed and stateless verification of a client based on a dynamically generated browser challenge in accordance with some embodiments presented herein. Process 400 may be implemented by any verification device or server of the verification system irrespective of whether that verification device or server generated and/or provided the dynamically generated browser challenge to the client that is the subject of the verification.

Process 400 may include receiving (at 402) a request with a solution and an answer token. The solution and answer token may be passed as one or more cookies that accompany the request. Alternatively, the solution and/or answer token may be embedded in a header or body of the request packet.

Process 400 may include determining (at 404) a unique identifier of the client device issuing the request. In some embodiments, the verification device may determine (at 404) the unique identifier from the source network address and user agent parameters provided in the request header. In some other embodiments, additional header parameters, such as supported browser version numbering, may be used to determine the unique identifier of the requesting client.

Process 400 may include determining (at 406) whether the provided answer token has expired or remains valid. In particular, the verification device may extract and/or decrypt an expiration time from the answer token, and may determine if the expiration time has passed or specifies a time in the future. In some embodiments, the expiration time may be encrypted and/or otherwise obfuscated in the answer token to prevent tampering or modification by a client.

In response to determining (at 406—No) that the answer token is not valid as a result of the answer token having expired, process 400 may include invalidating (at 408) the request and/or reverifying the client. For instance, in response to receiving an expired answer token, the verification device may generate and send a new problem for the client to solve while restricting that client from accessing requested data. Invalidating (at 408) the request may include blocking or dropping the request, or sending an error or access denied message to the requesting client.

In response to determining (at 406—Yes) that the answer token is valid and has not expired, process 400 may include determining (at 410) whether the determined (at 404) unique identifier for the requesting client matches the unique identifier set in the answer token. As noted above, a verification device may add the unique identifier of the requesting client to the answer token when generating and sending the browser challenge and the answer token to the requesting client. The inclusion of the client unique identifier ensures that no other client solves the problem or submits a solution to the problem that was generated for another client. In other words, the inclusion of the client unique identifier prevents one client from sharing the answer token that was generated for that client's request with another client, and/or prevents one client from generating a solution that matches the encrypted answer of the answer token and distributing the solution and answer token to other clients for unauthorized access. Accordingly, the verification device may extract and/or decrypt the unique identifier for the original client from the answer token, and may compare the unique identifier from the answer token to the unique identifier that is formed from the parameters of the received request.

In response to determining (at 410—No) that the unique identifier from the request does not match the unique identifier from the answer token, process 400 may include invalidating (at 408) the request and/or reverifying the client. For instance, if the IP address or user agent of the client submitting the request does not match the IP address or the user agent for the client that was the recipient of the problem and answer token, then the verification device may determine that the answer token is being shared by different clients, and may prevent those clients from accessing content, services, and/or data.

In response to determining (at 410—Yes) that the unique identifier from the request matches the unique identifier from the answer token, process 400 may include decrypting (at 412) the answer to the generated problem from the answer token. The verification device may use an encryption/decryption key to obtain the correct value for the answer from the encrypted/obfuscated value in the answer token.

Process 400 may include comparing (at 414) the solution received (at 402) with the request to the answer that is decrypted (at 412) from the answer token. The verification device may verify the requesting client without having to solve the problem that was sent to the requesting client, and/or without performing a lookup to determine a mapping between the problem that was sent to the requesting client and an answer for that problem. Instead, the comparison (at 414) may be performed based solely on a determination of whether a first value (e.g., the solution) matches a second value (e.g., the decrypted answer).

In response to determining (at 414—No) that the solution does not match the decrypted answer from the answer token, process 400 may include invalidating (at 408) the request and/or reverifying the client. In response to determining (at 414—Yes) that the solution matches the decrypted answer from the answer token, process 400 may include responding (at 416) to the request with the requested content, service, and/or data. For instance, the verification device may obtain the requested content from local cache or from another node, and may directly distribute the content to the requesting client in response to the request. Alternatively, the verification device may forward the requesting client request to another server or node that hosts the requested content upon successfully verifying the client. In some embodiments, responding (at 416) to the request may include providing a verified token to the client. The verification device may generate the verified token upon successfully verifying the client. The verified token may differ from the answer token by including the unique identifier of the successfully verified client, a flag or value that indicates the client has been successfully verified, and an expiration time during which the client may request and/or access content, services, and/or data without having to be verified again. The unique identifier, verification flag or value, and/or expiration time may be encrypted in the verified token to prevent tampering or modification.

Figure 5:
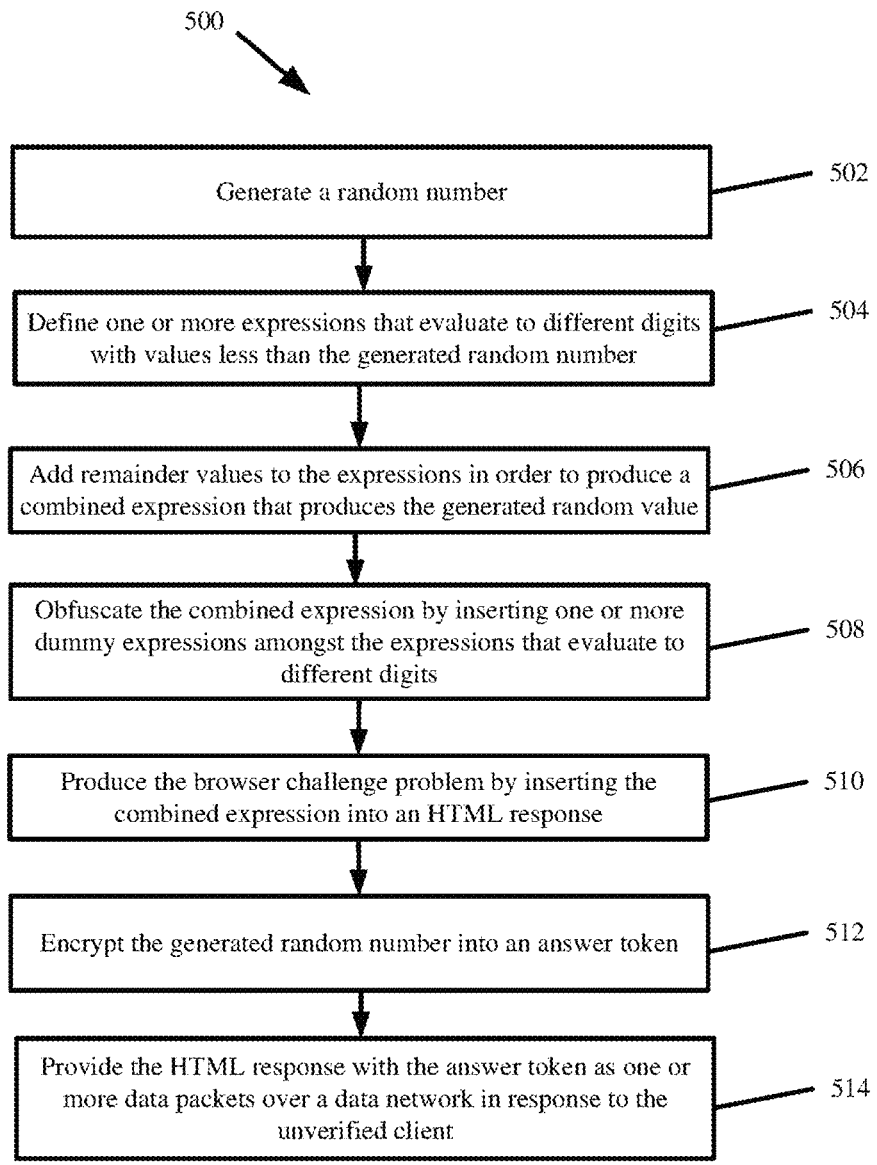
FIG. 5 presents a process for dynamically generating a browser challenge problem from a random number generated answer in accordance with some embodiments presented herein.

FIG. 5 presents a process 500 for dynamically generating a browser challenge problem from a random number generated answer in accordance with some embodiments presented herein. Process 500 may be implemented by a verification device that receives a request from an unverified client, and/or that receives a request that does not include an answer token or a valid verified token.

Process 500 may include generating (at 502) a random number using a random number generator. The random number generator may constrain the range of the random number that is generated. For instance, the random number generator may output a value between 1 and 100,000. In some embodiments, the random number generated may be seeded with a current timestamp (e.g., date and/or time) that varies the output of the random number generator.

Process 500 may include defining (at 504) one or more expressions that evaluate to different digits with values between 1 and 9 and/or with values less than the generated (at 502) random number. In some embodiments, each expression may include a set of mathematical operations or computer code (e.g., HTML, JavaScript, and/or other code) that evaluates to a value that is less than the generated (at 502) random number. For instance, the expression "((!![ ]||!! [ ])+!![ ]<<(true<<1))" in JavaScript may evaluate to 8.

Process 500 may include adding (at 506) different remainder values to one or more of the expressions in order to produce a combined expression that produces the generated (at 502) random value. In some embodiments, the verification device may randomize the remainder value that is added to the different expressions. For instance, the verification device may add different values between 1-9 to different expressions.

Process 500 may include obfuscating (at 508) the combined expression by inserting one or more dummy expressions amongst the expressions that evaluate to different digits. The dummy expressions may include a set of mathematical operations that evaluate to a value of 0 or that produce no change to the overall combined expression. The dummy expressions may be provided to make the resulting browser challenge problem more difficult to scrape, and/or to add further randomness in different problems that may evaluate to the same final value.

For instance, the combined expression below may represent a dynamically generated browser challenge problem in JavaScript that evaluates to the value 329 by adding together different expressions that evaluate to different digits between 1-9 with remainder values between 1-9 and with dummy expressions:

"([1]+[1]%1-1)+((!![ ]||!![ ])+!![ ]<<(true<<1))+7+ (!!{ }+!!{ }+!!{ }<<1)+5+(_=1,_=1+1,_=_<<_)+((1<<1)/ (1<11)+true)+(true<<1)+(!{ }|!!{ })+(!{ }|!!{ })+ (true<<1)+((1<<1)/(1<11)+true)+(_=1,_=1+1,_=_<<_)+5+ (!!{ }+!!{ }+!!{ }<<1)+7+((!![ ]||!![ ])+!![ ]<<(true<<1))+ ([1]+[1]%1-1)+([1]+[1]%1-1)+((!![ ]||!![ ])+!![ ]<< (true<<1))+7+(!!{ }+!!{ }+!!{ }<<1)+5+(_=1,_= 1+1,_=_<<_)+((1<<1)/(1<11)+true)+(true<<1)+(!{ }|!! { })+(!{ }|!!{ })+(true<<1)+((1<<1)/(1<11)+true)+(_= 1,_=1+1,_=_<<_)+5+(!!{ }+!!{ }+!!{ }<<1)+7+((!![ ]||!! [ ])+!![ ]<<(true<<1))+([1]+[1]%1-1)+([1]+[1]%1-1)+ ((!![ ]!!![ ])+!![ ]<<(true<<1))+7+(!!{ }+!!{ }+!!{ }<<1)+5+ (_=1,_=1+1,_=_<<_)+((1<<1)/(1<11)+true)+(true<<1)+ (!{ }|!!{ })+(!{ }|!!{ })+(true<<1)+((1<<1)/(1<11)+true)+ (_=1,_=1+1,_=_<<_)+5+(!!{ }+!!{ }+!!{ }<<1)+7+ ((!![ ]||!![ ])+!![ ]<<(true<<1))+([1]+[1]%1-1)+([1]+[1]% 1-1)+((!![ ]||!![ ])+!![ ]<<(true<<1))+7+(!!{ }+!!{ }+!! { }<<1)+5+(_=1,_=1+1,_=_<<_)+((1<<1)/(1<11)+true)+ (true<<1)+(!{ }|!!{ })+14".

Process 500 may include producing (at 510) the browser challenge problem by inserting the combined expression into an HTML response. The HTML response may include instructions that cause an unverified client to evaluate the combined expression (e.g., in JavaScript, another scripting language, or via other operations), to set a cookie with the solution, and/or to return the solution and/or cookie with a next request or network data packet directed to the same destination or URL of the original request that returned the browser challenge problem.

Process 500 may include encrypting (at 512) the generated (at 502) random number (e.g., the answer to the browser challenge problem) into an answer token. The answer token may also be encrypted with the network address and/or user agent of an unverified client that initiated the verification procedure by submitting a request without a valid verified token or an answer token. The answer token may also include an encrypted timestamp. Process 500 may include providing (at 514) the HTML response with the answer token as one or more data packets over a data network to the unverified client.

In some embodiments, the distributed, stateless, and dynamic browser challenge generation and verification may be supplemented and/or strengthened with other forms of verification. This may include combining the distributed, stateless, and dynamic browser challenge generation and verification with other unobtrusive or obtrusive client verifications.

Figure 6:
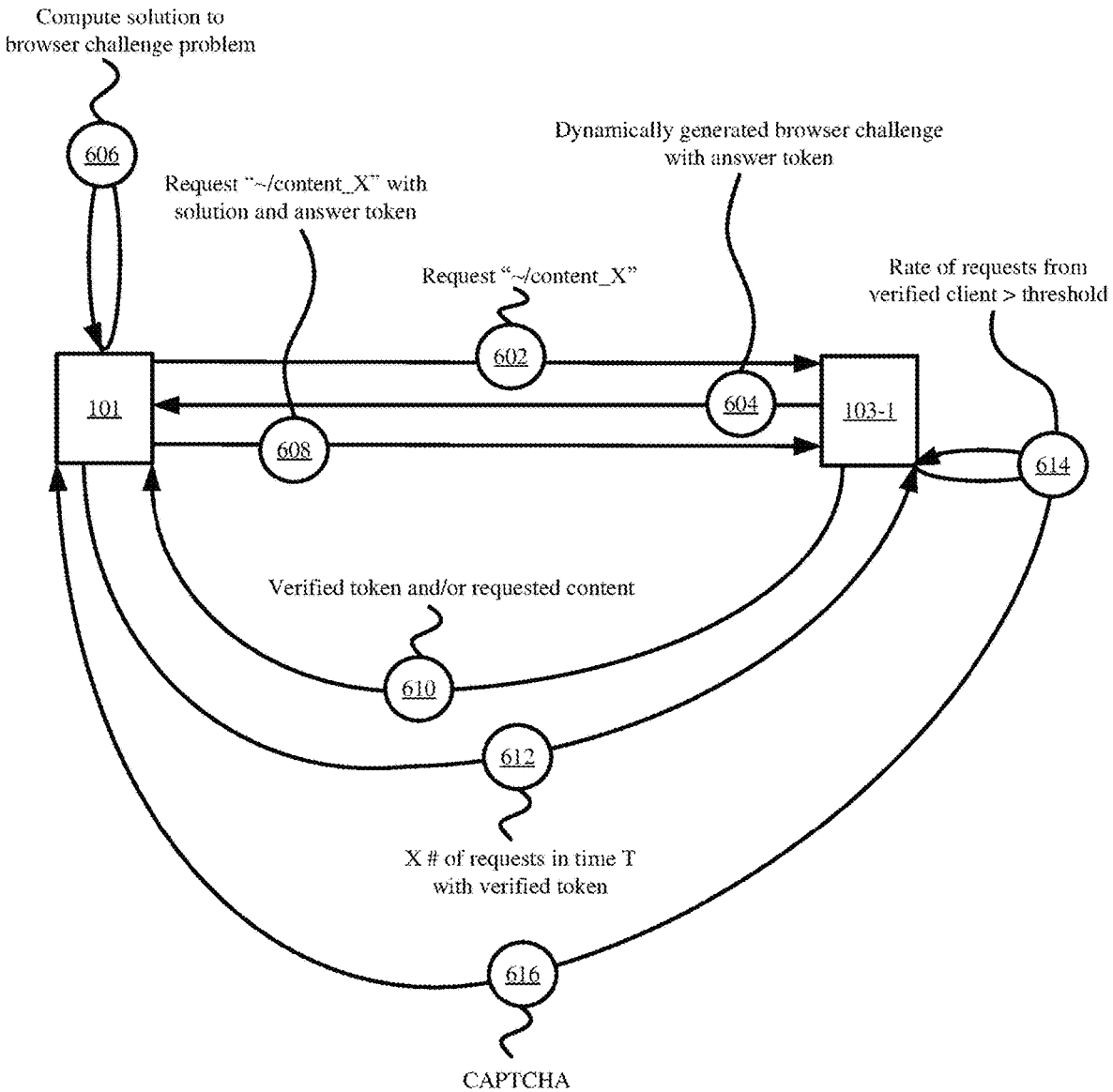
FIG. 6 illustrates performing a multi-stage verification of a client in accordance with some embodiments presented herein.

FIG. 6 illustrates verification device 103 performing a multi-stage verification of client 101 in accordance with some embodiments presented herein. As shown in FIG. 6, client 101 may transmit (at 602) a request without an answer token or a verified token to verification device 103 over a data network (e.g., the Internet).

Verification device 103 may determine that client 101 is an unverified client, and may respond by providing (at 604) client 101 with a dynamically generated browser challenge problem and an answer token that encrypts the answer to the dynamically generated browser challenge problem. Client 101 may generate (at 606) a solution to the dynamically generated browser challenge problem, and may reissue (at 608) the request with the solution and the answer token to verification device 103.

Verification device 103 may verify client 101 based on the provided solution matching the answer to the dynamically generated browser challenge problem that is decrypted from the answer token. Verification device 103 may provide (at 610) client 101 with a verified token and/or requested content.

Client 101 may issue (at 612) subsequent requests and/or messages to verification device 103 with the verified token to identify client 101 as a verified client. However, verification device 103 may detect (at 614) that the rate of data packets from client 101 may exceed a threshold. Accordingly, verification device 103 may perform (at 616) a secondary obtrusive CAPTCHA verification of client 101. The CAPTCHA verification may require human interaction to verify client 101 as being a valid user. Alternatively, verification device 103 may perform (at 614) the CAPTCHA verification in response to detecting unusual access behavior by client 101 and/or potentially malicious data in the requests and/or data packets originating from client 101.

In some embodiments, the CAPTCHA verification may be performed at another verification device, server, or node that operates in the same distributed platform as verification device 103. For instance, client 101 may obtain the verified token, and may spawn a set of bots that spoof the addressing and user agent of client 101. The bots may use the verified token to request data and/or attack other nodes of the distributed platform. The other verification devices may determine that the verified token is valid, but may determine that the number of data packets being issued with the verified token across the distributed platform exceed a threshold, and may implement the secondary verification.

Figure 7:
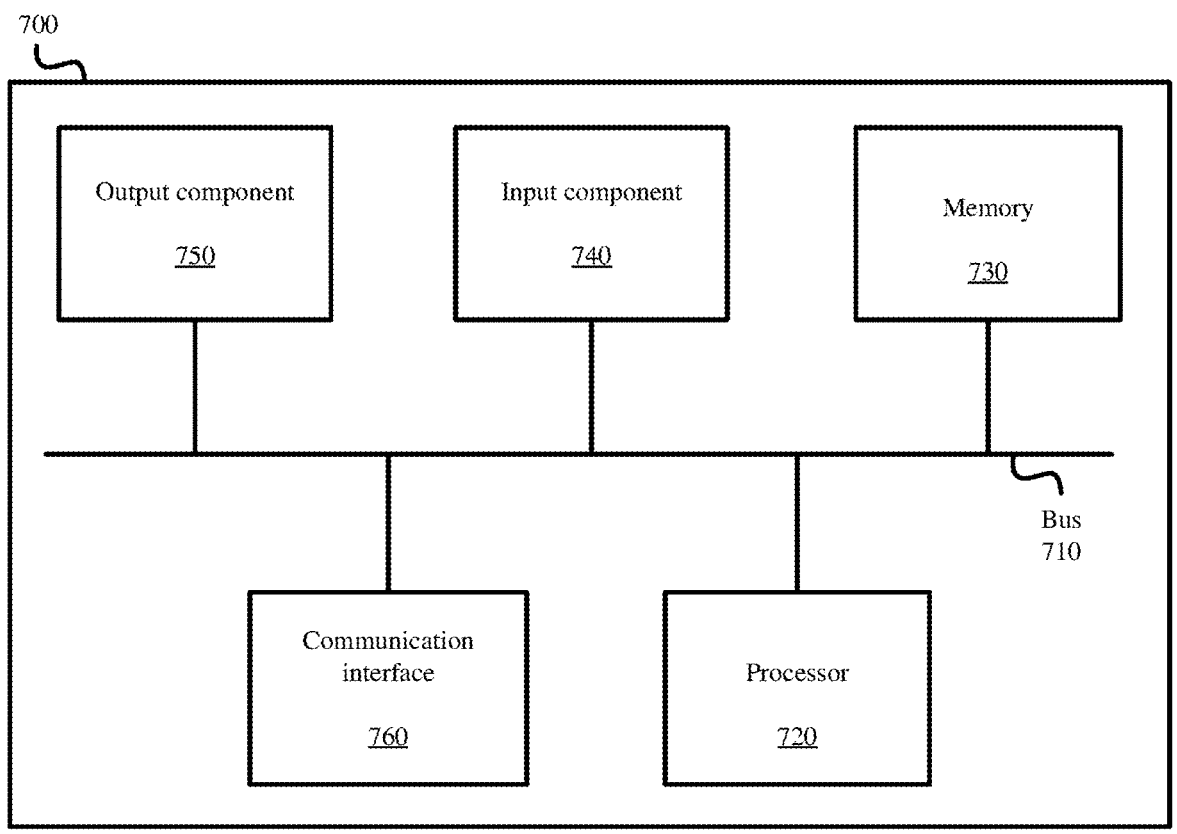
FIG. 7 illustrates example components of one or more devices, according to one or more embodiments described herein.

FIG. 7 is a diagram of example components of device 700. Device 700 may be used to implement one or more of the devices or systems described above (e.g., client 101, verification device 103, servers, distributed platform nodes, etc.). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes ("LEDs"), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   analyzing a response received by a device from a client device subsequent to the client device requesting verification from a different device and the different device responding to the client device with an electronic message comprising (i) an answer token indicating a first identifier associated with the client device and (ii) a prompt including one or more browser-executable instructions, the response received by the device from the client device comprising the answer token, a second identifier associated with the client device, and a browser-generated answer to the prompt, the analyzing comprising determining, by the device, whether the browser-generated answer included in the response matches a known answer indicated by the answer token included in the electronic message from the different device and whether the second identifier matches the first identifier indicated by the answer token of the response; and in response to determining, by the device, that the browser-generated answer received from the client device matches the known answer indicated by the answer token received from the client device and the first identifier matches the second identifier, triggering, by the device, the verification of the client device by the device, the verification enabling the client device access to content.

2. The method of claim 1, further comprising:
receiving, by the different device, a request from the client device for the verification of the client device respective to the access to the content;
communicating, by the different device to the client device and in response to the request, the electronic message comprising the answer token and the prompt including the one or more browser-executable instructions; and
receiving, by the device, the response from the client device, the response including the answer token and the browser-generated answer to the prompt.

3. The method of claim 2, further comprising:
generating, in response to the request from the client device, the answer token and the prompt including the one or more browser-executable instructions.

4. The method of claim 3, wherein generating the answer token comprises generating the known answer and encoding information regarding the known answer in the answer token.

5. The method of claim 4, wherein encoding the information regarding the known answer in the answer token comprises encoding the known answer in the answer token.

6. The method of claim 1, wherein determining, by the device, whether the browser-generated answer included in the response matches the known answer indicated by the answer token comprises:
decoding the answer token to produce the known answer; and
comparing the browser-generated answer from the client device to the known answer.

7. The method of claim 1, further comprising:
performing the verification, the verification comprising generating a verification token based on the verification, the verification token comprising a value that enables the access to the content.

8. The method of claim 7, further comprising:
communicating, over a network, the verification token to the client device, wherein the access to the content is based on the client device having the verification token associated therewith.

9. The method of claim 7, wherein:
the verification token further comprises an identifier, and the access to the content is enabled upon the first identifier of the answer token matching the identifier of the verification token.

10. The method of claim 1, further comprising:
in response to determining, by the device, that the browser-generated answer from the client device does not match the known answer indicated by the answer token, denying the verification of the client device.

11. The method of claim 1, wherein the browser-generated answer to the prompt is generated by a browser of the client device based on execution, by the browser, of the one or more browser-executable instructions included in the prompt.

12. The method of claim 11, further comprising generating, by the browser of the client device, the browser-generated answer to the prompt, wherein generating the browser-generated answer to the prompt includes the browser executing the one or more browser-executable instructions included in the prompt.

13. A system comprising:
at least one processor; and
at least one storage medium having encoded thereon executable instructions that, when executed by the at least one processor, cause the at least one processor to carry out a method of processing verification for a client device subsequent to the client device requesting verification from a different device and the client device receiving from the different device an electronic message including (i) an answer token indicating a first identifier associated with the client device and (ii) a prompt including one or more browser-executable instructions, the method comprising:
analyzing a response received from the client device in response to the electronic message presented by the different device, the response received from the client device comprising the answer token, a second identifier associated with the client device, and a browser-generated answer to the prompt, the analyzing comprising determining whether the browser-generated answer matches a known answer indicated by the answer token and whether the second identifier matches the first identifier indicated by the answer token of the response; and
in response to determining that the browser-generated answer from the client device matches the known answer indicated by the answer token and the first identifier matches the second identifier, triggering the verification of the client device, the verification enabling the client device access to content.

14. The system of claim 13, wherein the method further comprises:
receiving a request from a verification-seeking device for the verification of the verification-seeking device respective to the access to the content;
communicating to the verification-seeking device, in response to the request, an electronic message comprising a verification prompt and a verification answer token; and
in response to receiving a verification response from the verification-seeking device, the verification response including a verification answer to the verification prompt, analyzing the verification response using the verification answer to the verification prompt and the verification answer token.

15. The system of claim 14, wherein the method further comprises:
generating, in response to the request from the verification-seeking device, the verification prompt and the verification answer token.

16. The system of claim 15, wherein generating the verification answer token comprises generating a known verification answer and encoding information regarding the known verification answer in the verification answer token.

17. The system of claim 16, wherein:
generating the verification prompt comprises generating a set of operations to be performed to yield a result and encoding the set of operations in the browser-executable verification prompt as browser-executable instructions; and
generating the result of the set of operations as the known verification answer.

18. The system of claim 17, wherein the set of operations comprises one or more expressions, mathematical computations, and/or browser operations.

19. At least one non-transitory computer-readable storage medium having encoded thereon executable instructions that, when executed by at least one processor, cause the at least one processor to carry out a method of processing verification for a client device subsequent to the client device requesting verification from a different device and the client device receiving from the different device an electronic message including (i) an answer token indicating a first identifier associated with the client device and (ii) a prompt including one or more browser-executable instructions, the method comprising:

analyzing a response received from the client device in response to the electronic message presented by the different device, the response received from the client device comprising the answer token, a second identifier associated with the client device, and a browser-generated answer to the prompt, the analyzing comprising determining whether the browser-generated answer matches a known answer to the prompt indicated by the answer token and whether the second identifier matches the first identifier indicated by the answer token of the response; and in response to determining that the browser-generated answer from the client device matches the known answer indicated by the answer token, triggering the verification of the client device, the verification enabling the client device access to content.

\* \* \* \* \*